No. 800,832. PATENTED OCT. 3, 1905.
C. A. ROLFE.
ELECTRICAL PROTECTIVE DEVICE.
APPLICATION FILED DEC. 29, 1903.
2 SHEETS—SHEET 1.
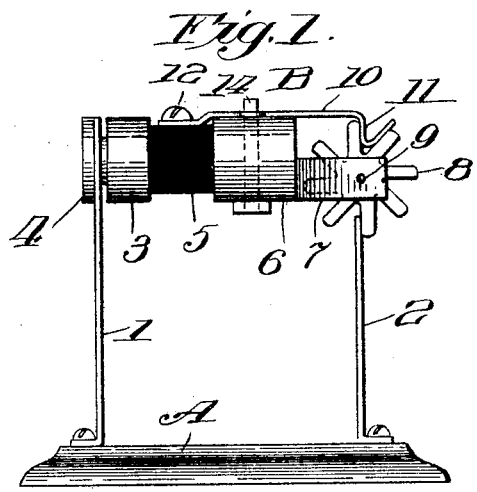
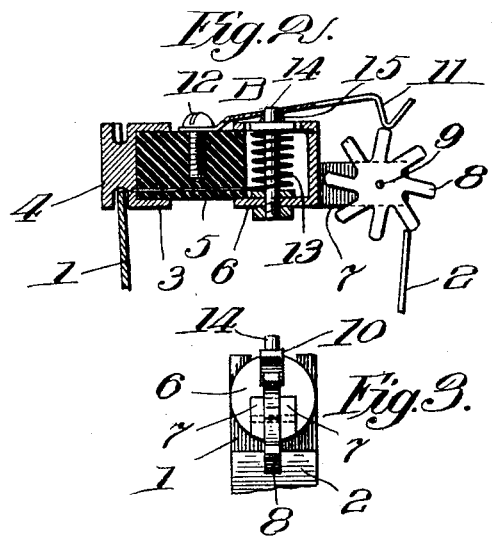
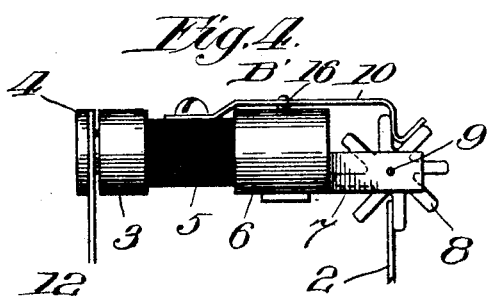
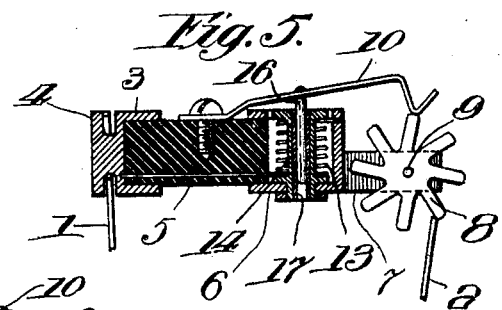
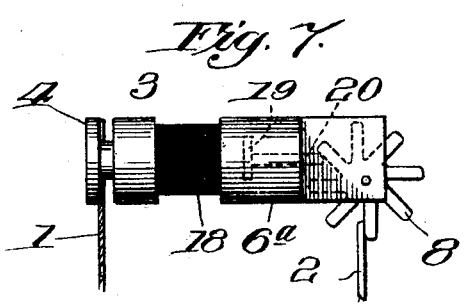
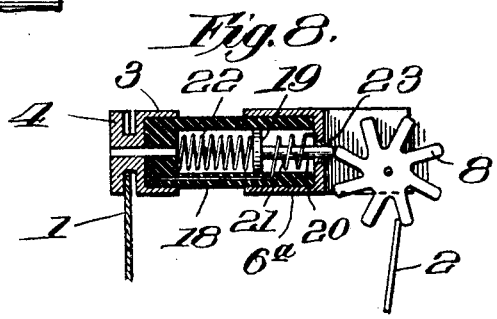
Witnesses:
H. S. Gaither.
J. C. Lee.
Inventor:
Charles A. Rolfe
by A. Miller Belfield
atty No. 800,832. PATENTED OCT. 3, 1905.
C. A. ROLFE.
ELECTRICAL PROTECTIVE DEVICE.
APPLICATION FILED DEC. 29, 1903.

2 SHEETS—SHEET 2.

Witnesses:
H. S. Gaither.
J. C. Lee

Inventor:
Charles A. Rolfe.
by A. Miller Belfield
atty

UNITED STATES PATENT OFFICE.

CHARLES A. ROLFE, OF ADRIAN, MICHIGAN, ASSIGNOR, BY MESNE ASSIGNMENTS, TO ROLFE ELECTRIC CO., OF ROCHESTER, NEW YORK, A CORPORATION OF NEW YORK.

ELECTRICAL PROTECTIVE DEVICE.

No. 800,832.     Specification of Letters Patent.     Patented Oct. 3, 1905.

Application filed December 29, 1903. Serial No. 187,043.

*To all whom it may concern:*

Be it known that I, CHARLES A. ROLFE, a citizen of the United States, residing at Adrian, in the county of Lenawee and State of Michigan, have invented a certain new and useful Improvement in Electrical Protective Devices, of which the following is a full, clear, concise, and exact description, reference being had to the accompanying drawings, forming a part of this specification.

My invention relates to electrical-circuit protectors for protecting low-tension circuits—such as telephone, police-telegraph, fire-alarm, and the like—from the injurious effects of powerful currents emanating from electric light, power, trolley, and similar circuits.

Prominent objects of the invention are to provide a simple, practical, and inexpensive device of the kind specified, to make it unnecessary to repair or replace any of the parts of the device after operation, to simplify the construction and reduce the expense of the device, and to accomplish the foregoing and other desirable results in a simple and expeditious manner.

Figure 9:
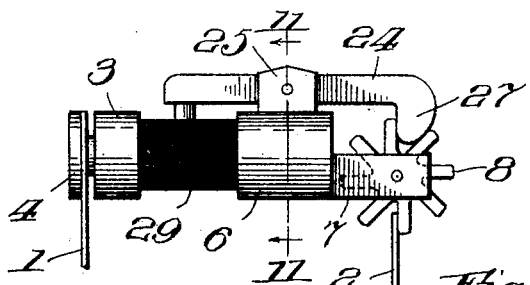
Figure 10:
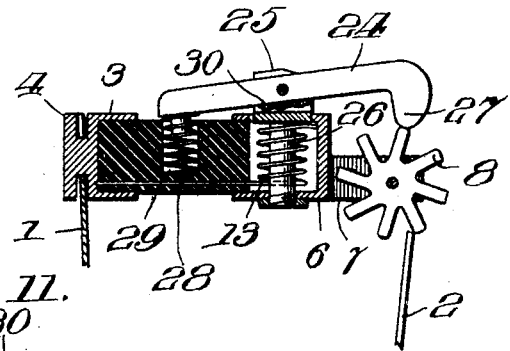
Figure 11:
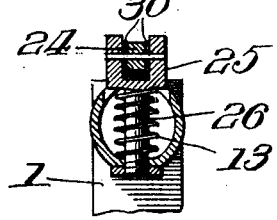
Figure 12:
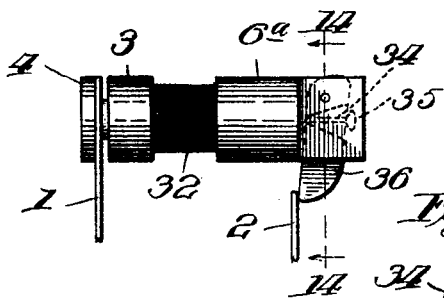
Figure 13:
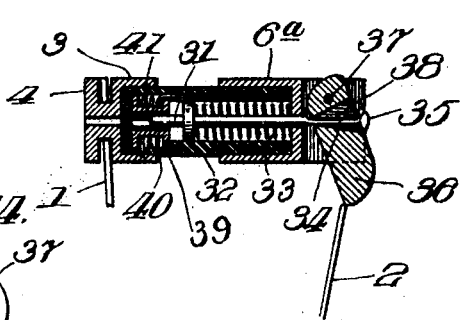
Figure 14:
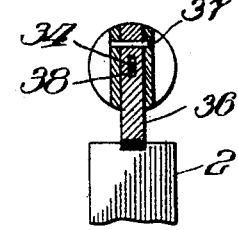

In the accompanying drawings, Figure 1 is a side elevation of a device embodying my present invention. Fig. 2 is a longitudinal section of a portion of the same in the act of operating. Fig. 3 is an end view of the device as shown in Fig. 1. Figs. 4 and 5 are a side elevation and a longitudinal section, respectively, of a modified form of device. Fig. 6 is an end view of the same. Figs. 7 and 8 are a side elevation and a longitudinal section, respectively, of another modification. Figs. 9 and 10 are a side elevation and a longitudinal section, respectively, of another modification, Fig. 10 showing the same in the act of operating. Fig. 11 is a section taken on line 11 11 in Fig. 9. Figs. 12 and 13 are respectively a side elevation and a longitudinal section of another modification, the latter figure showing the same in the act of operating. Fig. 14 is a section taken on line 14 14 in Fig. 12.

Referring first to the device shown in Figs. 1, 2, and 3, A is an insulating-base made of porcelain, wood, or other insulating material and of any desired shape or form. Two line-springs 1 and 2 rise from the base A. These line-springs tend to spring apart or separate from one another. Both line-springs have their upper ends forked, the fork of the line-spring 2, however, being lower down than that of line-spring 1. These line-springs support a heat-cartridge B, which engages them and holds them under tension against separation from one another. The heat-cartridge B comprises a metallic terminal 3, having a head 4, a block or cylinder 5 of insulation, preferably ebonite, and a metallic member 6, having one end secured to the block 5. The member 6, which is reduced in size at 7, is slotted thereat and supports in its slotted portion a wheel 8, which is loosely mounted on a pivot or axis 9. A spring 10, having a bent end or hook 11, is secured, as by a screw 12, to the insulating-block 5 and extended over the member 6, so that the hook 11 is engaged above the wheel 8 and adapted to engage the spokes thereof. A coil 13 of fine insulated wire is confined in the member 6, which is for such purpose made hollow, and the core 14 of this coil 13 is extended through the upper and lower walls of the member 6 to hold the coil properly in place. One end of the coil 13 is connected with the member 6 and the other end is connected with the terminal 3, as shown in Fig. 2. A small quantity of solder 15 is arranged upon the top of the spool of the coil 13, so that the spring 10 when lying in its normal flat position rests against this solder and is held thereby in such position. The circuit is made from one line-spring of the device to the other through the heat-cartridge B by way of the star-wheel 8, member 6, coil 13, and terminal 3. The operation of the device is as follows: Under normal conditions the springs 1 and 2 engage the head 4 of the terminal 3 and one of the spokes of the wheel 8, respectively. The wheel 8 is held against rotation by the spring 10, which is held in position to retain the wheel 8 against rotation by the solder 15. When an unduly-strong current traverses the circuit, the coil 13 heats the solder 15 sufficiently to melt or soften the same, whereupon the spring 10 is released, thereby in turn releasing the wheel 8, which is turned by the line-spring 2 sufficiently to allow such spring to escape and free itself from the wheel 8. The circuit is thereby broken between the wheel 8 and the line-spring 2. At such time, however, the wheel 8 is turned sufficiently to allow the hook 11 of the spring 10 to drop into the next space between the next successive spokes and again resume its normal position, as shown in Fig. 1. As the device cools off the solder 15 hardens, thereby resoldering the spring 10 in its normal condition and restoring the heat-cartridge to condition to be again engaged by the line-spring 2 and the device placed in condition for another operation.

In the arrangement shown in Figs. 4, 5, and 6 a heat-cartridge B' is arranged in the same manner as the heat-cartridge of the foregoing device. The cartridge B' is constructed in the same manner as the cartridge B, except that the spring 10 is connected with a plunger 16, arranged to work in the core 14' of the spool on which the coil 13 is mounted, the core 14' being made hollow for such purpose. A small quantity of solder 17 is confined in the core 14', so as to hold the plunger 16 normally within said core, as shown in Fig. 4. Thus in this device the turning of the wheel 8 by the line-spring 2 on the passage of an unduly-strong current lifts the plunger 16, as shown in Fig. 5, because of the melting or softening of the solder 17. When the wheel 8 is turned to allow the spring 10 to descend again, however, the plunger 16 also descends in the core 14' and is resoldered in such condition.

In the device shown in Figs. 7 and 8 an insulating-sleeve 18 is arranged between the terminal members 3 and 6ª, in which is arranged a sliding piston 19, whose plunger 20 extends out through the vertical wall of the member 6ª, so as to permit it to engage the spokes of the star-wheel 8. A coil 21 of fine wire is arranged about the plunger 20, and a coil-spring 22 is confined in the insulating-sleeve 18 in the rear of the piston 19. The coil 21 is connected at one end to the terminal 3 and at the other end to the member 6ª. A small quantity of solder 23 is confined in the aperture in the wall of the member 6ª, through which the plunger 20 passes. The operation of this device is in general the same as the preceding devices, the plunger 20 holding the wheel 8 normally against movement, but being pushed inwardly by the turning of said wheel by the line-spring 2 on the passage of an unduly-strong current. The plunger 20 is pushed out again by the spring 22, when the wheel 8 is turned by one spoke and the plunger is resoldered in its outermost position in engagement with the next spoke.

In the device shown in Figs. 9, 10, and 11 a swinging lever 24 is pivoted to a shank 25, conveniently formed as the upper portion of the spool 26, containing a coil 13 of fine insulated wire. The lever 24 has a nose 27 adapted to engage the teeth of the star-wheel 8, and the other end of the lever 24 is arranged above a coil-spring 28, confined in a recess in the insulating block or cylinder 29. A small quantity 30 of solder is arranged in the slotted head or shank 25 of the spool 26 and holds the lever 24 normally against movement. In this arrangement the wheel 8 is held normally by the lever 24, the latter being in turn held by the solder 30. The softening of the solder 30 by an unduly-strong current passing in the coil 13 allows the lever 24 to be swung up, as shown in Fig. 10, whereupon the line-spring 2 is released and the circuit broken. The lever 24 is swung down by the coil-spring 28, so as to engage another tooth of the star-wheel 8, after which the solder 30 hardens and thereby resolders the lever 24 in its normal condition, so as to put the device in condition for another operation.

In the arrangement shown in Figs. 12, 13, and 14 a plunger 31 is confined in an insulating-sleeve 32 and arranged for a slight extent of movement. A coil-spring 33 is arranged about one end of the plunger 31 and adapted to hold the same in its innermost position. The end of the plunger 31 is reduced, as at 34, and this reduced end projects out from the terminal member 6ª into the slotted end thereof and is provided with a head 35. A catch or trigger 36 is confined in the slot of the member 6ª and is pivoted at 37, so that its lower end can swing longitudinally of the cartridge. The catch 36 is provided with an aperture 38 to accommodate the reduced end 34 of the plunger as the catch 36 swings back and forth. A spool 39, bearing a coil 40 of insulated wire, is confined at the inner end of the insulating-sleeve 32. The core of this spool is hollow, and the inner end of the plunger 31 fits and works therein. A layer 41 of solder is arranged within the core of the spool 39 and around the plunger 31. One end of the coil 40 is connected to the terminal 3 and the other end to the terminal member 6ª. In its normal condition this device is maintained in the position shown in Fig. 12, the catch 36 being drawn inwardly by the spring 33 acting upon the plunger 31, and it is held in this condition by the layer of solder 41 engaging the rear or inner end of said plunger. The heat generated in the coil 40 on the passage of an unduly-strong current releases the plunger 31, whereupon the line-spring 2 swings the catch 36 outwardly, as shown in Fig. 13, thereby causing the release of said line-spring and breaking the circuit. Immediately upon the release of the line-spring by the catch 36 the spring 33 forces the plunger 31 back into its innermost position, and thereby draws the catch 36 back into its normal or retracted position. In such position it is resoldered by the hardening of the layer of solder 41.

It will be understood that the foregoing arrangements are intended to illustrate the principle and operation of my present invention, although I do not mean to confine myself to them, as it is obvious other forms embodying the same principles may be readily devised, nor do I intend to limit myself to the specific construction of the forms herein shown, as it is obvious that changes and modifications may be made therein without departing from the spirit of the invention.

What I claim is—

1. In apparatus of the class specified, the combination with means for controlling the circuit, of an excess-current-operated device comprising mechanism for coöperating with said circuit-controlling means, and a self-restoring controlling device for controlling said coöperating mechanism.

2. In apparatus of the class specified, the combination with means for controlling the circuit, of a heat-cartridge comprising mechanism for coöperating with said circuit-controlling means, and a self-soldering device for controlling said coöperating mechanism.

3. In apparatus of the class specified, the combination with means for opening the circuit, of a heat-cartridge comprising mechanism engaging and coöperating with said circuit-opening means, and a self-restoring controlling device for controlling said coöperating mechanism.

4. In apparatus of the class specified, the combination with spring means for opening the circuit, of a heat-cartridge comprising mechanism for coöperating with said spring means, and a self-restoring controlling device for controlling said coöperating mechanism.

5. In apparatus of the class specified, the combination of spring means for opening the circuit, and a heat-cartridge comprising mechanism for coöperating with said spring means, and a self-soldering controlling device for controlling said coöperating mechanism.

6. In apparatus of the class specified, the combination with spring means for opening the circuit, of a heat-cartridge comprising mechanism for engaging said spring means, and a self-soldering controlling device for controlling said engaging means.

7. In apparatus of the class specified, the combination with a pair of line-springs for controlling the circuit, of a heat-cartridge comprising mechanism for engaging said line-springs, a controlling device for controlling said mechanism, a quantity of material affected by heat governing the controlling mechanism, and a heat-concentrating device adapted to affect said material.

8. In apparatus of the class specified, the combination with a pair of line-springs for controlling the circuit, of a heat-cartridge holding said line-springs normally in restraint, said cartridge comprising means for engaging the line-springs, a retaining device for retaining said engaging device normally against operation, a quantity of material susceptible to a moderate excess of heat controlling said retaining device, and a heat-concentrating device adapted to affect said material on the passage of an unduly-strong current.

9. In apparatus of the class specified, the combination of a pair of line-springs, a heat-cartridge holding said line-springs normally under tension, said cartridge comprising a terminal for engaging one of the line-springs, a star-wheel for engaging the other, a retaining device for engaging said star-wheel, said retaining device being adapted to resume its normal position, a small quantity of solder normally holding said retaining device against action, and a heat-concentrating device for affecting said solder on the passage of an unduly-strong current.

10. In apparatus of the class specified, an excess-current-operated device comprising mechanism for coöperating with the circuit-controlling means, and a self-restoring device for controlling said coöperating mechanism.

11. In apparatus of the class specified, a heat-cartridge comprising mechanism for coöperating with the circuit-controlling means, and a self-soldering controlling device for controlling said coöperating mechanism.

12. In apparatus of the class specified, a heat-cartridge comprising mechanism for coöperating with a pair of line-springs, and a self-soldering controlling device for controlling said coöperating mechanism.

13. In apparatus of the class specified, the combination in a heat-cartridge of means for engaging a line-spring, a self-restoring retaining device for controlling said engaging means, a quantity of material susceptible to a moderate excess of heat controlling said retaining device, and a heat-concentrating device adapted to affect said material on the passage of an unduly-strong current.

14. In apparatus of the class specified, the combination in a heat-cartridge, of means for engaging a line-spring, a self-restoring retaining device controlling said engaging means, a small quantity of solder controlling said retaining device, and a heat-concentrating device for melting or softening said solder on the passage of an unduly-strong current.

15. In apparatus of the class specified, the combination in a heat-cartridge of a star-wheel, a self-restoring retaining device controlling said star-wheel, a small quantity of solder controlling said retaining device, and a heat-concentrating coil for melting or softening said solder on the passage of an unduly-strong current.

16. An electrical-circuit protector comprising thermally-operable securing means consisting of a holding device normally holding the protector against operation, and an engaging device for holding said holding device in condition to prevent operation, said engaging device having provisions for automatically restoring itself to operative condition.

17. An electrical-circuit protector comprising thermally-operable securing means consisting of a holding device for normally holding the protector against operation, and an engaging device for engaging said holding device, the protector having provisions whereby the holding device is automatically reset in operative condition and also having provisions whereby the engaging device is automatically resecured in position to engage and hold the holding device.

18. An electrical-circuit protector comprising thermally-operable securing means consisting of a holding device for normally holding the protector against operation, and an engaging device for engaging said holding device, the protector having provisions whereby the holding device is automatically reset in operative condition and also having provisions whereby the engaging device is automatically resoldered in position to engage and hold the holding device.

19. An electrical-circuit protector comprising a pair of supporting-strips and a solder-joint heat-cartridge supported by said strips, said cartridge comprising a holding device for holding the protector against operation, and an engaging device for engaging and holding said holding device, said protector having provisions for automatically resetting said holding device and the cartridge having provisions for automatically resoldering said engaging device in position to restrain said holding device.

In witness whereof I hereunto subscribe my name this 16th day of November, A. D. 1903.

CHARLES A. ROLFE.

Witnesses:
A. MILLER BELFIELD,
I. C. LEE.